United States Patent
Miao et al.

(10) Patent No.: US 11,733,863 B2
(45) Date of Patent: Aug. 22, 2023

(54) DISPLAY DATA OBTAINING METHOD, ELECTRONIC DEVICE AND STORAGE MEDIUM

(71) Applicant: BEIJING XIAOMI MOBILE SOFTWARE CO., LTD., Beijing (CN)

(72) Inventors: Jian Miao, Beijing (CN); Jubao Hu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/585,257

(22) Filed: Jan. 26, 2022

(65) Prior Publication Data

US 2023/0045025 A1 Feb. 9, 2023

(30) Foreign Application Priority Data

Aug. 3, 2021 (CN) .......................... 202110886640.7

(51) Int. Cl.
*G06F 3/04886* (2022.01)
*G06F 9/451* (2018.01)
(Continued)

(52) U.S. Cl.
CPC ...... *G06F 3/04886* (2013.01); *G06F 3/04847* (2013.01); *G06F 3/04892* (2013.01); *G06F 3/04897* (2013.01); *G06F 9/451* (2018.02)

(58) Field of Classification Search
CPC .... G06F 16/2465; G06F 40/30; G06F 40/279; G06F 40/284; G06F 13/16; G06F 3/1454; G06F 3/1462; G06F 2203/04805; G06F 3/0481; G03F 1/00; G03F 7/00; G03F 7/004; G03F 7/027; G03F 7/705; G03F 1/84; G03F 7/70433; G03F 1/36; G03F 9/7049; G03F 9/7088; G03F 7/202; G03F 7/70625; G03F 7/70258; G03F 7/70125; G03F 7/70633; G03F 7/70591; G03F 7/70941; G03F 1/68; G03F 1/70; G03F 7/70058; G03F 7/70091; G03F 7/70425;
(Continued)

(56) References Cited

U.S. PATENT DOCUMENTS 10,068,912 B1 * 9/2018 Singh .................. H01L 29/0649
2004/0148298 A1 * 7/2004 Terasawa ................ G06F 21/84
(Continued)

OTHER PUBLICATIONS

Extended European Search Report issued in Application No. 22153956. 2, dated Jul. 6, 2022,(11p).
Chris Simmonds: "The Android graphics path in depth The Android graphics path 1 Copyright 2011-2014, 2net Limited", Nov. 12, 2020, XP055933892, (44p).
(Continued)

*Primary Examiner* — Rayeez R Chowdhury
(74) *Attorney, Agent, or Firm* — Arch & Lake LLP

(57) ABSTRACT

A method is provided for obtaining display data. The method includes: obtaining rendering data corresponding to an application program surface; obtaining, in response to detecting an operation of adjusting a dimension of the application program surface, a transformation coefficient corresponding to the application program surface, where the transformation coefficient is a scale value between a dimension of the application program surface after adjustment and a dimension before adjustment; and obtaining display data of a corresponding masking layer of the application program surface according to the transformation coefficient and the rendering data.

12 Claims, 6 Drawing Sheets

(51) Int. Cl.
*G06F 3/04847* (2022.01)
*G06F 3/04892* (2022.01)
*G06F 3/0489* (2022.01)

(58) Field of Classification Search
CPC ... B29C 64/135; B29C 64/124; B29C 64/386; B29C 65/1635; B29C 65/1696; B29C 66/1122; B29C 66/43; B29C 64/268; B29C 65/1658; B29C 65/1677; B29C 66/21; B29C 66/73921; B29C 66/81267; B29C 66/8242; B29C 66/83413; B29C 66/83417; B29C 66/932; B29C 66/93451; B29C 66/939; B29C 66/961; B29C 66/98; B29C 65/16; B29C 65/1683; B29C 66/45; B29C 66/7392
See application file for complete search history.

(56) References Cited

U.S. PATENT DOCUMENTS

| | | | |
|---|---|---|---|
| 2007/0282673 A1* | 12/2007 | Nagpal | G06Q 10/06 705/7.29 |
| 2010/0057566 A1* | 3/2010 | Itzhak | G06Q 30/0273 705/14.69 |
| 2015/0143256 A1* | 5/2015 | Panchawagh-Jain | G06Q 10/10 715/752 |
| 2017/0308988 A1* | 10/2017 | Li | G06T 1/20 |
| 2021/0181827 A1* | 6/2021 | Zou | G06F 1/3231 |

OTHER PUBLICATIONS

Jacob Su: "How did Android SurfaceView Works? by Jacob su, Medium", Apr. 26, 2020, XP055933962, (6p).
Anonymous: "android-Understanding Canvas and Surface concepts—Stack Overflow", Feb. 17, 2017, XP055933969,(5p).

* cited by examiner

DISPLAY DATA OBTAINING METHOD, ELECTRONIC DEVICE AND STORAGE MEDIUM

CROSS REFERENCE TO RELATED APPLICATION

The present application is based on and claims priority to Chinese Patent Application No. 202110886640.7, filed on Aug. 3, 2021, the entire contents of which are incorporated herein by reference for all purposes.

BACKGROUND

Currently, an Android system supports a multi-window function, and a user may invoke an application program according to practical requirements. When the application program is started, a dimension of an application program window is an initial dimension. When the user needs to adjust the dimension of the application program window, the user may adjust the initial dimension to a target dimension by dragging the window. When the dimension of the window is adjusted, a layer may be added to an original layer of the Android system, the newly added layer serves as a masking layer, and a lower layer serves a masked layer, thus improving a special effect of masking.

In practical application, when masking is added, the Android system may load a picture through View or display different surfaces to realize a masking function, which needs to rely on a System Server process in the Android system. However, considering that the System Server process involves inter-process communication in an adding course, the course is time-consuming and prone to causing a phenomenon of display frame loss, so a viewing experience is affected.

SUMMARY

The present disclosure relates, but not limited, to the technical field of display technology, and more particularly, to a method and an apparatus for obtaining display data, an electronic device, and a non-transitory computer readable storage medium thereof.

According to a first aspect of the disclosure, a display data obtaining method is provided, and the method includes: obtaining rendering data corresponding to an application program surface; obtaining, in response to detecting an operation of adjusting a dimension of the application program surface, a transformation coefficient corresponding to the application program surface; and obtaining display data of a corresponding masking layer of the application program surface according to the transformation coefficient and the rendering data.

According to a second aspect of the disclosure, an electronic device is provided, and includes: a processor; and a memory used to store a computer program executable by the processor. The processor is configured to execute the computer program in the memory, so as to implement the method according to the first aspect of the disclosure.

According to a third aspect of the disclosure, a non-transitory computer readable storage medium is provided. The non-transitory computer readable storage medium stores a plurality of programs for execution by an electronic device having one or more processors, wherein the plurality of programs, when executed by the one or more processors, cause the electronic device to implement the method according to the first aspect of the disclosure.

It should be understood that the above general description and the following detailed description are merely examples and illustrative, and cannot limit the disclosure.

BRIEF DESCRIPTION OF THE DRAWINGS

The accompanying drawings, which are incorporated in and constitute a part of this specification, illustrate examples consistent with the disclosure and together with the specification serve to explain the principles of the disclosure.

DETAILED DESCRIPTION

Examples will be explained in detail herein and are illustrated in the accompanying drawings. When the following description refers to the accompanying drawings, the same numbers in different drawings represent the same or similar elements unless otherwise indicated. The examples described below do not represent all examples consistent with the disclosure. On the contrary, they are merely examples of an apparatus and a method consistent with some aspects of the disclosure as detailed in the appended claims.

It should be noted that, in the case of no conflict, the following examples and features in the implementations can be combined with each other.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
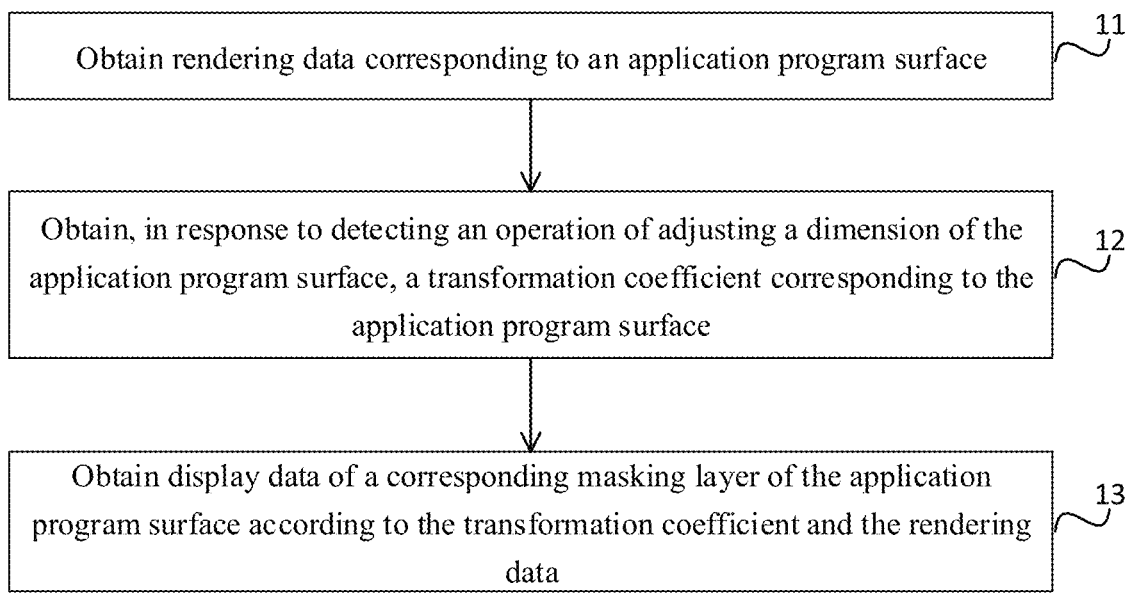
FIG. 1 is a flow chart of a display data obtaining method illustrated according to an example.

In order to solve the above technical problems, an example of the disclosure provides a display data obtaining method. FIG. 1 is a flow chart of a display data obtaining method illustrated according to an example. The method may be applied to electronic devices, such as a smart phone, a smart bracelet, a tablet computer, a personal computer, a smart television and other devices. An Android system and an application program (APP) may be installed in the electronic devices. With reference to FIG. 1, the display data obtaining method includes step 11 to step 13.

In step 11, rendering data corresponding to an application program surface are obtained.

In the example, in a display course, an electronic device may detect operations by a user on a display screen of the electronic device in real time or according to a set cycle. The above operations may include but are not limited to: click, double-click, dragging, long press, etc. When an operation of triggering the application program surface (such as a starting moment of dragging) by the user is detected, the electronic device may obtain the rendering data corresponding to the application program surface in response to detecting the operation of triggering the application program surface.

Figure 2:
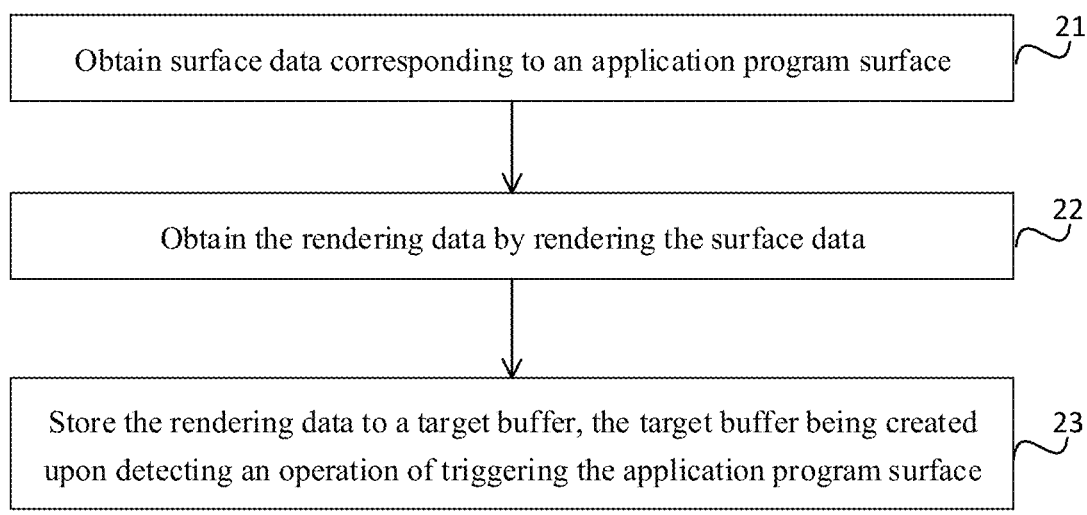
FIG. 2 is a schematic diagram of an effect of a page bar on a right page display position when display is performed in columns illustrated according to an example.

With reference to FIG. 2, in step 21, the electronic device may obtain surface data corresponding to the application program surface. When the application program on the electronic device is started, a corresponding surface of the application program surface is an initial surface, and a dimension of the initial surface is a first dimension. The surface data may include at least one of: a corresponding image (such as a last frame of image displayed) upon detecting the operation of triggering the application program surface, an image pre-stored locally and an image set in an application program (such as an icon of the application program). Suitable surface data may be selected based on a specific scenario, and under a condition that display data of a masking layer can be generated, corresponding solutions fall into the protective scope of the disclosure.

It needs to be noted that, in an example, in step 21, when the operation of triggering the application program surface is detected, a buffer-type SurfaceControl module will be simultaneously created, the SurfaceControl module includes a buffer, and the buffer is a target buffer in subsequent step 23.

In step 22, the electronic device may obtain the rendering data by rendering the surface data. It can be understood that, for a course of image rendering, reference may be made to the related art, and repetition is not made here. In an example, the rendering data are obtained by rendering the surface data through an interface API provided by a 2D hardware drawing module HWUI in the Android system, and the obtained rendering data are stored in a buffer corresponding to the 2D hardware drawing module HWUI.

In step 23, the electronic device may store the rendering data to the target buffer; and the target buffer is created upon detecting the operation of triggering the application program surface. In the example, the electronic device may bind rendering data drawn by the 2D hardware drawing module HWUI to the target buffer, such that an effect of storing the rendering data to the buffer in the SurfaceControl module is achieved.

In step 12, a transformation coefficient corresponding to the application program surface is obtained in response to detecting the operation of adjusting the dimension of the application program surface.

In the example, the transformation coefficient may include at least one of: a scale coefficient, a rotation angle and an offset distance. A technician may select a suitable transformation system according to the specific scenario, which is not limited here. To take the transformation coefficient being the scale coefficient as an example, the scale coefficient is a scale value between a dimension of the application program surface after adjustment and a dimension before adjustment. The solution is described by taking the scale coefficient as an example in subsequent examples.

Figure 3:
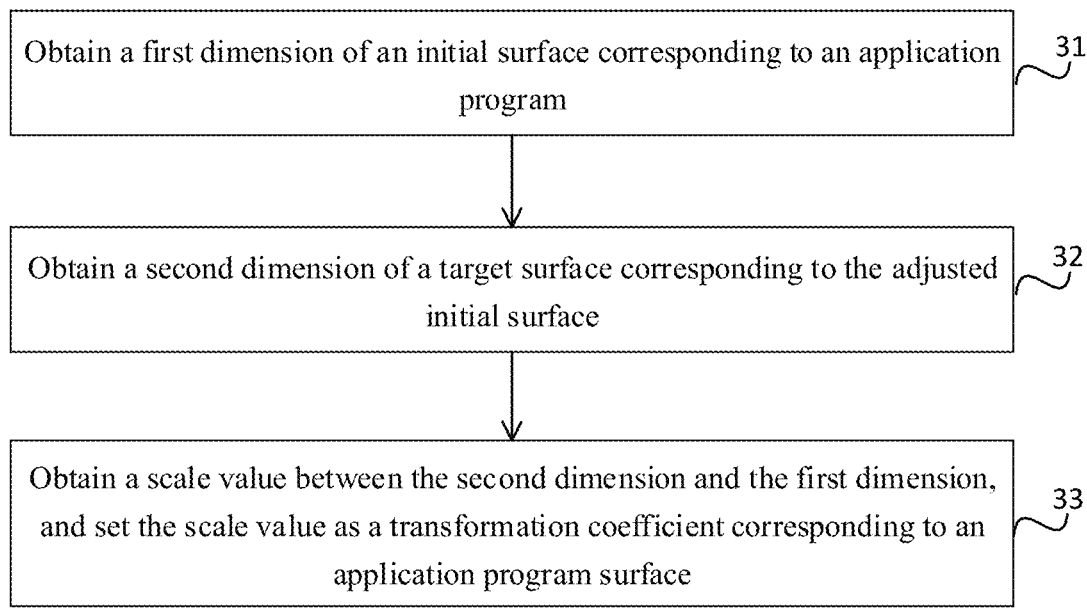
FIG. 3 is a flow chart of obtaining rendering data illustrated according to an example.
Figure 4:
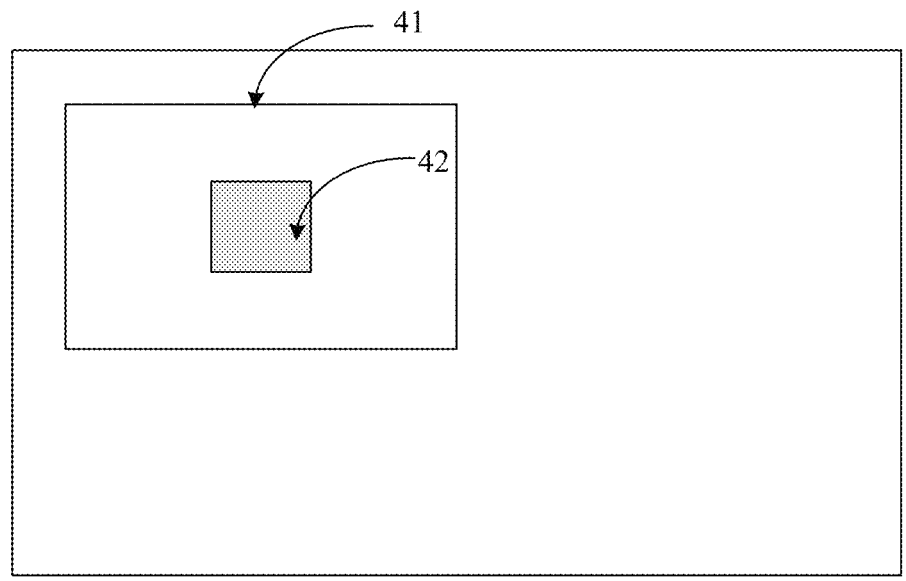
FIG. 4 is a schematic diagram of an initial surface of an application program surface illustrated according to an example.

In the example, the electronic device may continue to detect the operations by the user on the display screen of the electronic device in real time or according to the set cycle. The above operations may include but are not limited to: click, double-click, dragging, long press, etc. With reference to FIG. 3, in step 31, when it is detected that the operation of triggering the application program surface by the user (such as a middle moment or an ending moment after the starting moment of dragging) is adjusting the dimension of the application program surface, the electronic device may obtain the first dimension of the initial surface corresponding to the application program in response to detecting the operation of triggering the application program surface, such as the first dimension of the initial surface 41 in FIG. 4: a width W1 and a height H1. The initial surface 41 is generated when starting the application program in step 21. In step 32, the electronic device may obtain a second dimension of a target surface corresponding to the adjusted initial surface. For example, the initial surface 41 is amplified to the target surface 43 in a direction shown by v to obtain the second dimension of the target surface in FIG. 5: a width W2 and a height H2. In step 33, the electronic device may obtain a scale value between the second dimension and the first dimension, such as a width scale value W=W2/W1 or a height scale value H=H2/H1, and set the above scale value as the transformation coefficient corresponding to the application program surface.

In step 13, the display data of the corresponding masking layer of the application program surface are obtained according to the transformation coefficient and the rendering data.

Figure 5:
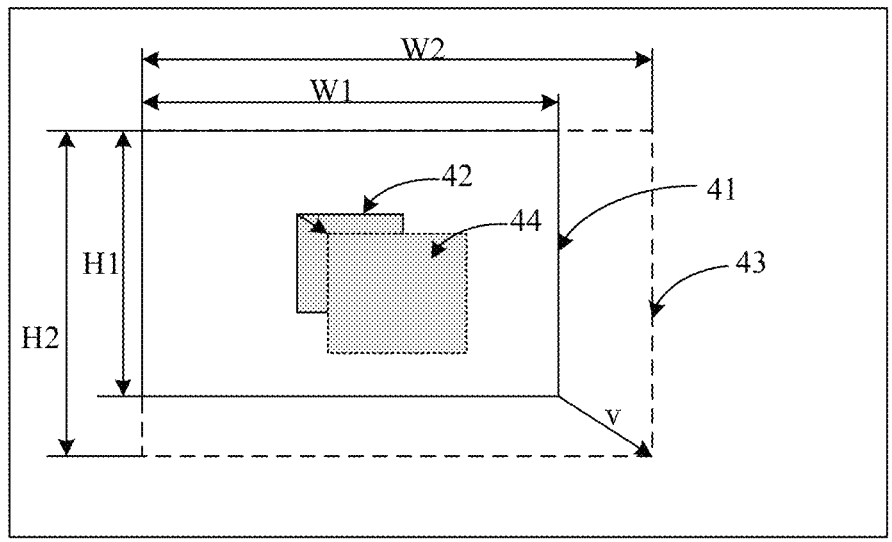
FIG. 5 is a schematic diagram of masking by dragging an application program surface to a target surface illustrated according to an example.

In the example, the electronic may obtain the display data of the corresponding masking layer of the application program surface according to the transformation coefficient and the rendering data. In an example, a display module in the electronic device may process the transformation coefficient and the rendering data, i.e. zoom the above rendering data according to the above transformation coefficient to obtain the display data. The display data are used for the corresponding masking layer of the application program surface, and the masking layer shown in FIG. 5 is finally formed, i.e. the image set in the application program, that is the icon of the application program, is displayed in the masking layer.

It needs to be noted that, in a course of zooming the above rendering data, the rendering data may be processed by adopting a preset filtering method (such as Gaussian Blur). Under a condition that processing of the rendering data can be implemented, corresponding solutions fall into the protective scope of the disclosure.

It further needs to be noted that, the above examples only describe the solution of adjusting a size of the masking layer. In practical application, transformation operations such as offset, rotation and the like may further be performed on masking, and corresponding solutions fall into the protective scope of the disclosure.

So far, in the solutions provided by the examples of the disclosure, the rendering data corresponding to the application program surface may be obtained upon detecting the operation of triggering the application program surface; then the transformation coefficient corresponding to the application program surface may be obtained in response to detecting the operation of adjusting the dimension of the application program surface, the transformation coefficient being the scale value between the dimension of the application program surface after adjustment and the dimension before adjustment; and then the display data of the corresponding masking layer of the application program surface are obtained according to the transformation coefficient and the rendering data. In this way, in the examples, the display data are obtained by adjusting the rendering data through the transformation coefficient, i.e. inter-process communication is not needed and communication time consumption can be reduced, which is conducive to avoiding or mitigating a phenomenon of display frame loss and improving a viewing experience.

Superiorities of the display data obtaining method provided by the example are described below in combination with an operation system of the electronic device.

A Solution of Adding a Masking Layer in the Related Art

Step 1: a user starts an application program (APP), and at the moment, a dimension of an application program surface is 3×3 cm. A SystemServer module in the operation system obtains the above dimension 3×3 cm.

Step 2: the user drags the above application program surface and amplifies it to a 6×6 cm target surface. A SystemServer module in the operation system obtains a dimension of the target surface, and sends it to the application program. At the moment, the application program requests the system to create a buffer with a dimension of 6×6 cm, and the buffer may contain the following information: a picture, such as an RGB value, a text, and pixel point information. A masking layer is re-drawn on the buffer.

Step 3: a Display module of the system obtains buffer data provided by step 2 and performs display.

A solution of adding a masking layer in the example is a display data obtaining method.

Step 1: the user starts the application program (APP), and at the moment, the dimension of the application program surface is 3×3 cm. A SystemServer module in the operation system obtains the above dimension 3×3 cm. At the moment, the buffer-type SurfaceControl module is created, and the size of the masking layer is 3×3 cm. The buffer may contain the following information: a picture, such as an RGB value, a text, and pixel point information. A masking layer is re-drawn on the buffer.

Step 2: the user drags the above application program surface and amplifies it to a 6×6 cm target surface. A SystemServer module in the operation system obtains a dimension 6×6 cm of the target surface, and the SystemServer module obtains a scale value 200% between a length and a width, i.e. obtain the transformation coefficient corresponding to the masking layer.

Step 3: the SystemServer module sends the above transformation coefficient 200% to the 2D hardware drawing module HWUI, and the 2D hardware drawing module HWUI sets a zooming coefficient. At the moment, the rendering data in the buffer are not changed.

Step 4: a Display module of the system obtains buffer data and the transformation coefficient provided by step 2 to perform zooming processing, and uses processed display data to perform display.

In contrastive analysis, compared with the solution in the related art, in the solution provided by the examples of the disclosure, only one buffer needs to be created, and the size of the masking layer is changed through the transformation coefficient. A new buffer does not need to be created every time the dimension of the application program is zoomed, so reliance on the SystemServer module in the operation system may be reduced, which may reduce time consumption and is conducive to mitigating a phenomenon of frame loss.

Figure 6:
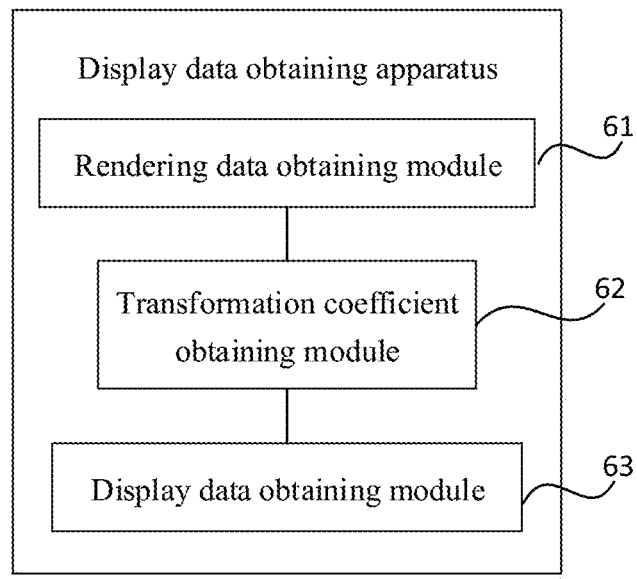
FIG. 6 is a block diagram of a display data obtaining apparatus illustrated according to an example.

On the basis of the display data obtaining method provided by the example of the disclosure, an example further provides a display data obtaining apparatus. With reference to FIG. 6, the apparatus includes:

a rendering data obtaining module 61, configured to obtain rendering data corresponding to an application program surface;

a transformation coefficient obtaining module 62, configured to obtain, in response to detecting an operation of adjusting a dimension of the application program surface, a transformation coefficient corresponding to the application program surface; and a display data obtaining module 63, configured to obtain display data of a corresponding masking layer of the application program surface according to the transformation coefficient and the rendering data.

Alternatively, the rendering data obtaining module includes:

a surface data obtaining unit, configured to obtain surface data corresponding to the application program surface;

a rendering data obtaining unit, configured to obtain the rendering data by rendering the surface data; and a rendering data storing unit, configured to store the rendering data to a target buffer. The target buffer is created upon detecting an operation of triggering the application program surface.

Alternatively, the surface data include at least one of: a corresponding image upon detecting the operation of triggering the application program surface, an image pre-stored locally and/or an image set in an application program.

Alternatively, the transformation coefficient includes at least one of: a scale coefficient, a rotation angle and/or an offset distance.

Alternatively, the transformation coefficient obtaining module includes:

a first dimension obtaining unit, configured to obtain a first dimension of an initial surface corresponding to the application program;

a second dimension obtaining unit, configured to obtain a second dimension of a target surface corresponding to the adjusted initial surface; and a transformation coefficient obtaining unit, configured to obtain a scale value between the second dimension and the first dimension, and set the scale value as the transformation coefficient corresponding to the application program surface.

It needs to be noted that, contents of the apparatus illustrated in the example are matched with contents of the method example illustrated in FIG. 1. Reference may be made to the contents of the above method example, and repetition is not made here.

Figure 7:
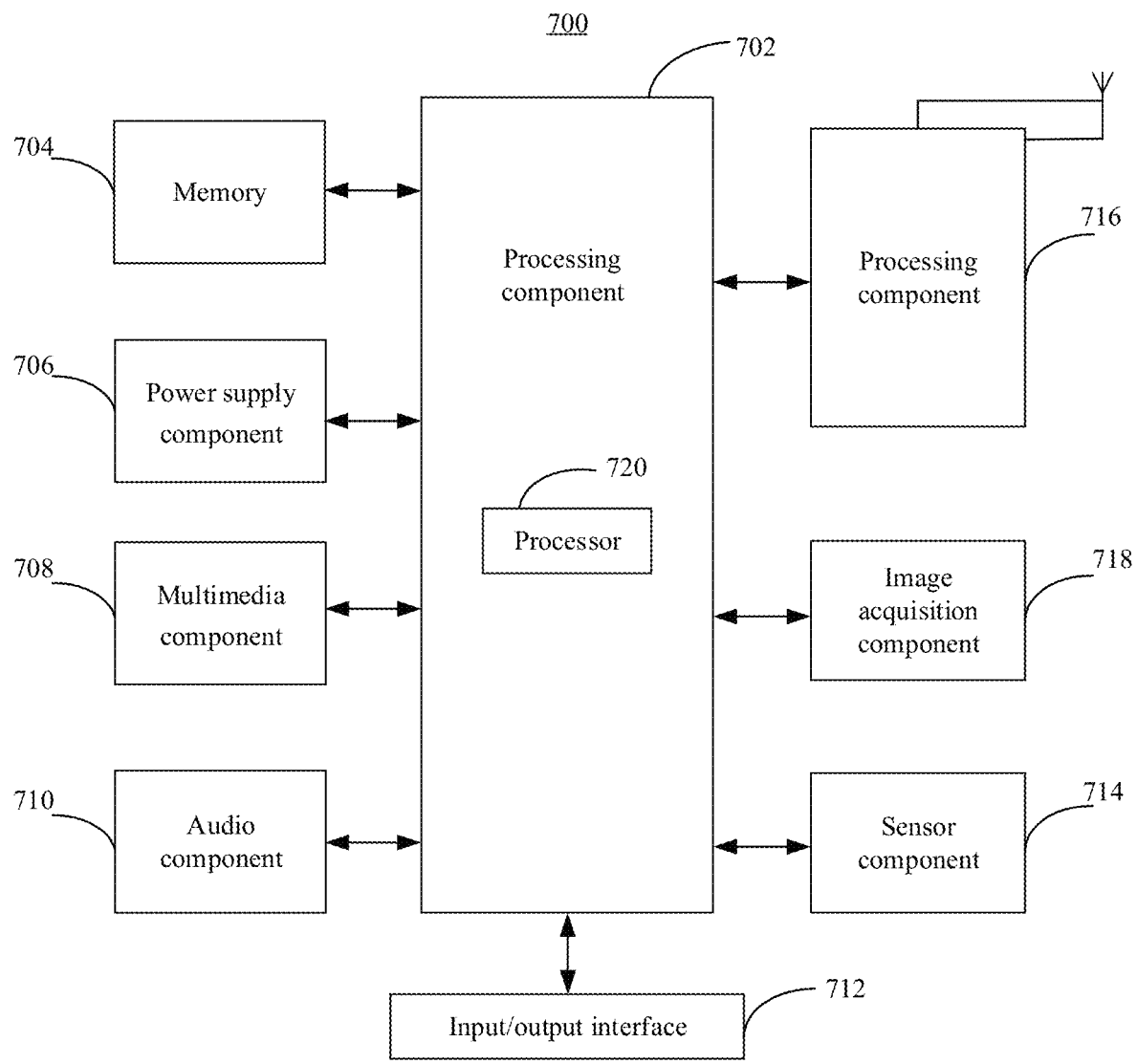
FIG. 7 is a block diagram of an electronic device illustrated according to an example.

FIG. 7 is a block diagram of an electronic device illustrated according to an example. For example, the electronic device 700 may be a smart phone, a computer, a digital broadcasting terminal, a tablet device, a medical device, a fitness device, a personal digital assistant, etc.

With reference to FIG. 7, the electronic device 700 may include one or a plurality of the following components: a processing component 702, a memory 704, a power supply component 706, a multimedia component 708, an audio component 710, an input/output (I/O) interface 712, a sensor component 714, a communication component 716, and an image acquisition component 718.

The processing component 702 generally controls overall operations of the electronic device 700, such as operations associated with display, telephone calls, data communications, camera operations, and recording operations. The processing component 702 may include one or a plurality of processors 720 to execute a computer program. In addition, the processing component 702 may include one or a plurality of modules to facilitate interaction between the processing component 702 and other components. For example, the processing component 702 may include a multimedia module to facilitate interaction between the multimedia component 708 and the processing component 702.

The memory 704 is configured to store various types of data to support the operations of the electronic device 700. Examples of these data include any application program or computer programs for method operating on the electronic device 700, contact data, phone book data, messages, pictures, videos, etc. The memory 704 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 706 provides power for various components of the electronic device 700. The power supply component 706 may include a power management system, one or a plurality of power supplies, and other components associated with the generation, management, and distribution of power for the electronic device 700. The power supply component 706 may include a power supply chip, and a controller may communicate with the power supply chip to control the power supply chip to turn on or off a switching device, so that a battery supplies or does not supply power to a main board circuit.

The multimedia component 708 includes a screen that provides an output interface between the electronic device 700 and a target object. In some examples, the screen may include a liquid crystal display (LCD) and a touch panel (TP). If the screen includes the touch panel, the screen may be implemented as a touch screen to receive input information from the target object. The touch panel includes one or a plurality of touch sensors to sense touch, wipe, and gestures on the touch panel. The touch sensors may not only sense a boundary of a touch or wipe action, but also detect a duration and pressure associated with a touch or wipe operation.

The audio component 710 is configured to output and/or input audio file information. For example, the audio component 710 includes a microphone (MIC). When the electronic device 700 is in an operation mode, such as a call mode, a recording mode, and a voice recognition mode, the microphone is configured to receive external audio file information. The received audio file information may be further stored in the memory 704 or sent via the communication component 716. In some examples, the audio component 710 further includes a speaker for outputting audio file information.

The I/O interface 712 provides an interface between the processing component 702 and a peripheral interface module. The above-mentioned peripheral interface module may be a keyboard, a click wheel, a button, and the like.

The sensor component 714 includes one or a plurality of sensors for providing the electronic device 700 with various aspects of state evaluation. For example, the sensor component 714 may detect on/off status of the electronic device 700, or relative positioning of the components, such as a display screen and a keypad of the electronic device 700. The sensor component 714 may also detect a position change of the electronic device 700 or a component, presence or absence of contact between the target object and the electronic device 700, an orientation or acceleration/deceleration of the electronic device 700, and a temperature change of the electronic device 700. In the example, the sensor component 714 may include a magnetic sensor, a gyroscope, and a magnetic field sensor, where the magnetic field sensor includes at least one of: a Hall sensor, a thin film magnetoresistance sensor, and a magnetic liquid acceleration sensor.

The communication component 716 is configured to facilitate wired or wireless communication between the electronic device 700 and other devices. The electronic device 700 may access a wireless network based on a communication standard, such as WiFi, 2G, 3G, 4G, 5G, or a combination of them. In an example, the communication component 716 receives broadcast information or broadcast-related information from an external broadcast management system via a broadcast channel. In an example, the communication component 716 also includes a near field communication (NFC) module to facilitate short-range communication. For example, the NFC module may be implemented based on radio frequency identification (RFID) technology, Infrared Data Association (IrDA) technology, ultra-wide-band (UWB) technology, Bluetooth (BT) technology and other technologies.

In the example, the electronic device 700 may be implemented by one or more of an application specific integrated circuit (ASIC), a digital information processor (DSP), a digital information processing device (DSPD), a programmable logic device (PLD), a field programmable gate array (FPGA), a controller, a microcontroller, a microprocessor or other electronic elements.

In an example, a non-transitory readable storage medium including an executable computer program is further provided, such as a memory 704 including instructions. The above executable computer program may be executed by a processor. The readable storage medium may be a ROM, a random access memory (RAM), a CD-ROM, a magnetic tape, a floppy disk, an optical data storage device, etc.

After considering the specification and practicing the disclosure disclosed herein, those of skill in the art will easily think of other implementations of the disclosure. The disclosure is intended to cover any variations, uses, or adaptive changes that follow the general principles of the disclosure and include common knowledge or conventional technical means in the technical field that are not disclosed in the disclosure. The specification and the examples are to be regarded as illustrative only.

It should be understood that the disclosure is not limited to the exact construction that has been described above and illustrated in the accompanying drawings, and that various modifications and changes may be made without departing from the scope of the disclosure. It is intended that the scope of the disclosure only be limited by the appended claims.

What is claimed is:

1. A method for obtaining display data, comprising:
   obtaining rendering data corresponding to an application program surface;
   obtaining, in response to detecting an operation of adjusting a dimension of the application program surface, a transformation coefficient corresponding to the application program surface; and
   obtaining display data of a corresponding masking layer of the application program surface according to the transformation coefficient and the rendering data;
   wherein obtaining the rendering data corresponding to the application program surface comprises:
   obtaining surface data corresponding to the application program surface;
   obtaining the rendering data by rendering the surface data; and storing the rendering data to a target buffer, wherein the target buffer is created upon detecting an operation of triggering the application program surface.

2. The method according to claim 1, wherein the surface data comprise at least one of following images: a corresponding image upon detecting the operation of triggering the application program surface, an image pre-stored locally, or an image set in an application program.

3. The method according to claim 1, wherein the transformation coefficient comprises at least one of following parameters: a scale coefficient, a rotation angle, or an offset distance.

4. The method according to claim 3, wherein obtaining the transformation coefficient corresponding to the application program surface comprises:
obtaining a first dimension of an initial surface corresponding to an application program;
obtaining a second dimension of a target surface corresponding to the initial surface that is adjusted; and
obtaining a scale value between the second dimension and the first dimension, and setting the scale value as the transformation coefficient corresponding to the application program surface.

5. An electronic device, comprising:
a processor; and
a memory used to store a computer program executable by the processor; wherein
the processor is configured to:
obtain rendering data corresponding to an application program surface;
obtain, in response to detecting an operation of adjusting a dimension of the application program surface, a transformation coefficient corresponding to the application program surface; and
obtain display data of a corresponding masking layer of the application program surface according to the transformation coefficient and the rendering data;
wherein the processor is further configured to:
obtain surface data corresponding to the application program surface;
obtain the rendering data by rendering the surface data; and
store the rendering data to a target buffer, wherein the target buffer is created upon detecting an operation of triggering the application program surface.

6. The electronic device according to claim 5, wherein the surface data comprise at least one of following images: a corresponding image upon detecting the operation of triggering the application program surface, an image pre-stored locally, or an image set in an application program.

7. The electronic device according to claim 5, wherein the transformation coefficient comprises at least one of following parameters: a scale coefficient, a rotation angle, or an offset distance.

8. The electronic device according to claim 7, wherein the processor is further configured to:
obtain a first dimension of an initial surface corresponding to an application program;
obtain a second dimension of a target surface corresponding to the initial surface that is adjusted; and
obtain a scale value between the second dimension and the first dimension, and set the scale value as the transformation coefficient corresponding to the application program surface.

9. A non-transitory computer readable storage medium storing a plurality of programs for execution by an electronic device having one or more processors, wherein the plurality of programs, when executed by the one or more processors, cause the electronic device to:
obtain rendering data corresponding to an application program surface;
obtain, in response to detecting an operation of adjusting a dimension of the application program surface, a transformation coefficient corresponding to the application program surface; and
obtain display data of a corresponding masking layer of the application program surface according to the transformation coefficient and the rendering data;
wherein the plurality of programs, when executed by the one or more processors, cause the electronic device further to:
obtain surface data corresponding to the application program surface;
obtain the rendering data by rendering the surface data; and
store the rendering data to a target buffer, wherein the target buffer is created upon detecting an operation of triggering the application program surface.

10. The non-transitory computer readable storage medium according to claim 9, wherein the surface data comprise at least one of following images: a corresponding image upon detecting the operation of triggering the application program surface, an image pre-stored locally, or an image set in an application program.

11. The non-transitory computer readable storage medium according to claim 9, wherein the transformation coefficient comprises at least one of following parameters: a scale coefficient, a rotation angle, or an offset distance.

12. The non-transitory computer readable storage medium according to claim 11, wherein the plurality of programs, when executed by the one or more processors, cause the electronic device further to:
obtain a first dimension of an initial surface corresponding to an application program;
obtain a second dimension of a target surface corresponding to the initial surface that is adjusted; and
obtain a scale value between the second dimension and the first dimension, and set the scale value as the transformation coefficient corresponding to the application program surface.

* * * * *